United States Patent

[11] 3,533,493

[72] Inventor Eugene R. Braun
 Royal Oak, Michigan
[21] Appl. No. 753,625
[22] Filed Aug. 19, 1968
[45] Patented Oct. 13, 1970
[73] Assignee Eaton Yale & Towne Inc.
 Cleveland, Ohio
 a corporation of Ohio

[54] TURBINE WITH BRAKE AND THERMOSTATIC SPEED CONTROL
 7 Claims, 1 Drawing Fig.
[52] U.S. Cl. .................................................. 192/3,
 192/.094, 192/13; 74/339; 188/90; 137/51;
 60/39.16, 60/39.28
[51] Int. Cl. .................................................. F16d 67/00
[50] Field of Search .......................................... 192/3, 4(B),
 .058, .094; 74/339

[56] References Cited
 UNITED STATES PATENTS
3,031,050 4/1962 Williams ........................ 192/3
3,139,166 6/1964 Berlyn ........................... 192/3
3,170,548 2/1965 Carriere ........................ 192/3
3,181,677 5/1965 Fisher et al. .................. 192/4(B)UX
3,255,642 6/1966 Christenson et al. ......... 192/4(B)X Primary Examiner—Benjamin W. Wyche, III
Attorney—Woodhams, Blanchard and Flynn ABSTRACT: In an engine having speed controlling means and an output shaft connected in association with load means, an energy absorbing device is connected to the output shaft for regulating the output speed thereof and fluid circuit means connected to the energy absorbing device for supplying and circulating fluid thereto. Temperature responsive means are connected in association with the fluid circuit means and responsive to the temperature of said fluid to issue a signal at a predetermined temperature of the fluid. Transformation means are also provided and are connected for actuation by said signal and further connected to the speed controlling means of the engine for controlling the rate of rotation of the output shaft of the engines.

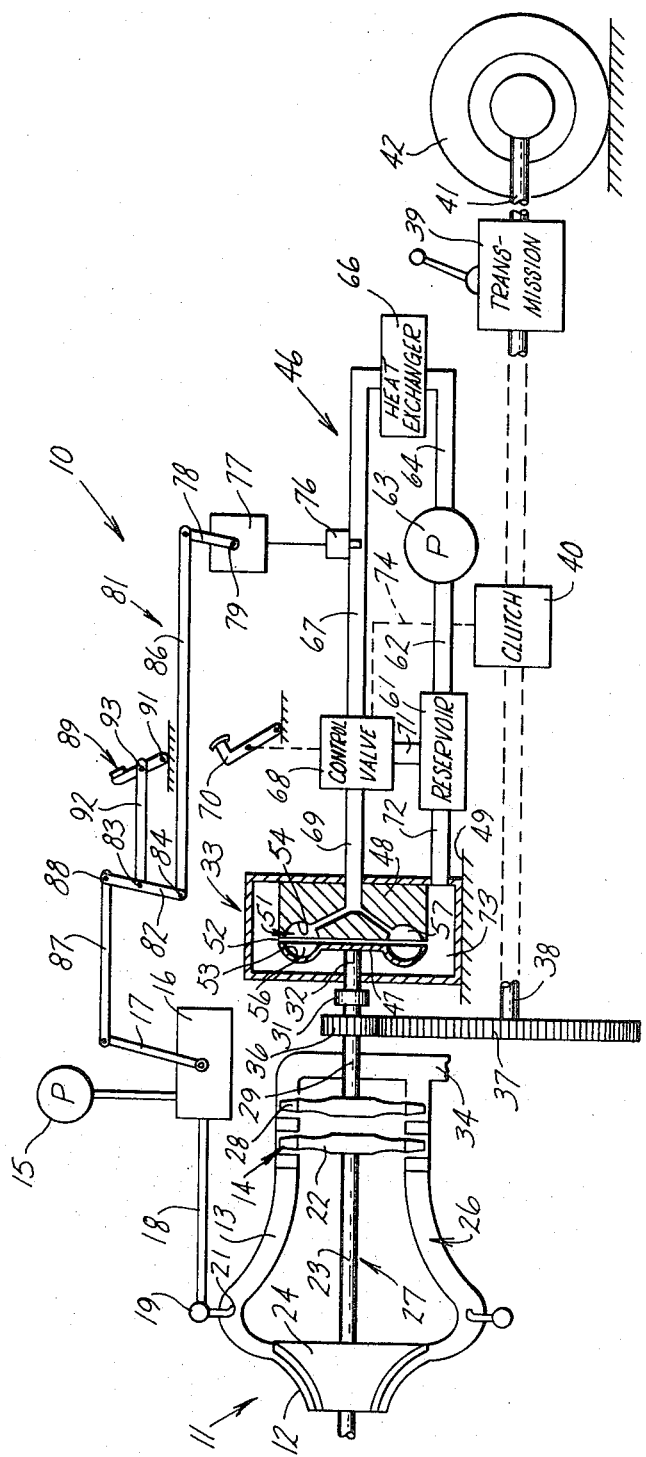

3,533,493

TURBINE WITH BRAKE AND THERMOSTATIC SPEED CONTROL

FIELD OF THE INVENTION

This invention relates to an assembly of a prime mover, such as a gas turbine, having a tendency toward excessive speed when the load is removed and a gear transmission utilizing spur gears and, more particularly, relates to an energy absorbing device connected in association with a prime mover and having means responsive to the temperature of an energy absorbing and dissipating liquid circulating through the energy absorbing device for governing the fuel input to the engine.

BACKGROUND OF THE INVENTION

In the development of gas turbines for automotive use, a variety of problems have been encountered of which one of the most troublesome has been the association of the turbine with effective transmission means for providing suitable speed ratios between the turbine output and the drive wheels of the vehicle. While the so-called two shaft, or free, turbine has more nearly approached the ideal torque curve for vehicular applications than the earlier known single shaft turbine, it is still desirable for the usual, and well-understood reasons to interpose a ratio changing device between the turbine output and the drive wheels of the vehicle. Some efforts in this direction have taken the form of torque converters, which, however, are not particularly efficient when used with a single shaft turbine and are even less efficient when used with a free turbine. This efficiency can be appreciably improved if the turbine is used with the transmission of the spur gear type but this introduces the problem of turbine runaway when the transmission is in neutral. This problem is serious enough in itself but it also complicates the synchronizing of the ratio gears during a shifting operation. Hence, it has in the past been thought that a transmission of the spur gear type, to be effective with a gas turbine, would either have to be capable of being shifted practically instantaneously or that means would have to be provided by which the transmission would impose a constant load on the turbine during its shifting procedure. The first of these possibilities is not feasible, particularly in a transmission of substantial weight, such as the transmissions used in a highway bus or in a truck, due to the weight of the parts and the time consequently required to overcome their inertia in connection with a shifting operation. The second of these possibilities is effective and is receiving serious attention. It sometimes takes the form of a friction brake mechanism (as in U.S. Pat. No. Application Ser. No. 669,046, assigned to the same assignee as the present invention) or a fluid retarder attached to the output shaft of the turbine. Both of these systems may, and often do, utilize a liquid as an energy absorbing and dissipating medium. These arrangements, however, while effective sometimes permit the power output of the engine to continue at a high level even when the load has been removed from the output shaft. This will often occur during a shift since drivers commonly hold the accelerator pedal unchanged during a shift. If this occurs, high temperatures are developed in the energy absorbing medium and such high operating temperatures not only impair the capacity of the medium to absorb further energy (heat) but said high temperatures can and often do damage the various operating components within the liquid circuit.

Furthermore, since there is no load being driven by the gas turbine engine during this time but a high level of power is being developed, fuel is wasted.

Accordingly, apparatus is highly desirable which will both protect a turbine engine from overspeeding when the load is removed and protect it from overheating of the retarder system by automatically reducing the fuel supply to the engine if and as needed and if the operator does not. Therefore, the objects of this invention include:

1. To provide a temperature responsive gas turbine engine control device which is responsive to the temperature of energy absorbing means for controlling the speed of rotation of the output shaft of the gas turbine engine.
2. To provide a temperature responsive gas turbine engine control device which is operable independent of the operator.
3. To provide a temperature responsive gas turbine engine control device, as aforesaid, which protects the engine from overspeeding and protects the output shaft retarding mechanism from damage due to overheating.
4. To provide a temperature responsive gas turbine engine control device, as aforesaid, wherein the fuel consumption of the gas turbine engine is controlled during the time that the speed of rotation of the output shaft is being checked.
5. To provide a temperature responsive gas turbine engine control device, as aforesaid, which is reliable and operable at a minimum of maintenance.
6. To provide a temperature responsive gas turbine engine control device, as aforesaid, which is inexpensive to assemble utilizing readily available components.

Other objects and purposes of this invention will be apparent to persons acquainted with apparatus of this general type upon reading the following specification and inspecting the accompanying drawing which schematically illustrates the temperature responsive gas turbine engine control device.

Certain terminology will be used in the following description for convenience in reference only and will not be limiting. The words "up", "down", "right" and "left" will designate directions in the drawing to which reference is made. The words "front" and "rear" will refer to directions to the left and to the right, respectively, of the device illustrated in the drawing. The words "in" and "out" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the invention are met by providing a temperature responsive device arranged in association with engine connected energy absorbing means and responsive to the temperature of said energy absorbing means. Said device will issue a signal at a predetermined temperature in said energy absorbing means for actuation of transformation apparatus which is connected to speed controlling apparatus on an engine, whereby to control the rate of rotation of the output shaft thereof.

DETAILED DESCRIPTION

Referring now to the drawings for illustration of a specific embodiment of the invention, there is shown a free turbine-type gas turbine engine 11 of the type for use in land vehicles such as trucks, automobiles and the like. The engine 11 comprises compressor apparatus 12, combustion apparatus 13 and a compressor turbine 14. The combustion apparatus comprises a fuel pump 15 which delivers fuel to a valve 16 controllable by a lever arm 17. The fuel is then supplied to a line 18, manifold 19 and nozzles of which one appears at 21.

The turbine 14 includes a rotor 22 which is connected by a shaft 23 to the rotor 24 of the compressor apparatus 12. The compressor apparatus 12, combustion apparatus 13 and turbine 14 constitute a gas generator 26. The rotors 22 and 24 and the shaft 23 constitute a gas generator rotor 27, hereinafter referred to as the rotor. The motive fluid or driving gas discharged from the gas generator 26 flows through a power turbine 28 which drives a power output shaft 29. The power output shaft is coupled through an appropriate coupling device 31 to the input shaft 32 of a fluid retarder mechanism 33, such as that shown in detail in U.S. Pat. No. 3,291,268, wherein a liquid is used as the energy absorbing medium. The gas exhausted from the power turbine is discharged through a duct 34.

A gear 36 is mounted on, or otherwise coupled to, the output shaft 29 and is rotatable therewith. A gear 37 is supported on a shaft 38, is rotatable therewith and is in driving engagement with the gear 36. A clutch 40 is interposed on the shaft 38 between the gear 37 and a standard-type, spur gear, transmission 39. The transmission has an output shaft 41 in driving engagement with a load, such as the wheels 42 of a vehicle.

The retarder mechanism 33 used in this embodiment may be, with proper controls, the same mechanism as that utilized also to prevent downhill vehicle runaway (as in U.S. Pat. No. 3,291,268) or it may be provided solely to control the turbine. However, as illustrated and described herein it is assumed to be solely for controlling the turbine and, as such, is shown connected to the turbine output shaft and is assumed to be of horsepower capacity only to prevent turbine runaway. Said retarder mechanism 33 has a fluid circuit 46 connected in association therewith. More particularly, the retarder mechanism 33 comprises an input member 47 and an output member 48. In this particular embodiment, the output member 48 is fixed to a stationary frame 49. The input member 47 is spaced slightly axially from the output member 48 to define a pressure creating zone 51 and a fluid discharge gap 52 therebetween.

The pressure creating zone 51 is defined by a pair of oppositely facing annular troughs 53 and 54 of semicircular cross section. Each trough 53 and 54 has a plurality of circumferentially spaced blades 56 and 57, respectively, oriented as disclosed in said U.S. Pat. No. 3,291,268.

The fluid, here liquid, circuitry 46 comprises a liquid reservoir 61 having a conduit 62 interconnecting the reservoir 61 with the input of a pressure creating device such as a pump 63. A conduit 64 interconnects the output of the pump 63 with the input of a heat exchanger 66.

A conduit 67 interconnects the output of the heat exchanger 66 with the input of a control valve 68. The heat exchanger 66 must be selectively matched to the maximum energy absorption of the retarder which is in turn matched to the engine 11 so that the horsepower capacity thereof is less than the horsepower output of the engine 11 at some selected safe speed and load condition. For example, where a liquid retarder is used, the selected condition may be normal operating speed at the full load of which the retarder is capable. Thus, the temperature of the liquid within the circuit 46 will rise whenever the turbine speed exceeds such safe condition which it will tend to do if, for example, the operator undertakes a shift at full throttle.

The control valve 68 is controllable by any convenient means such as a manually operated pedal 70. It is to be recognized, of course, that the pedal 70 can also operate the clutch 40 (indicated by the broken line 74) so that the operativeness of the retarder mechanism 33 will be synchronized with the disengagement of the clutch 40 and the removal of the load from the output shaft 29 of the engine 11 independent of the operator. A conduit 69 interconnects the output of the control valve 68 with the pressure creating zone 51 in the retarder mechanism 33. A return conduit 71 interconnects the bypass port on the control valve 68 with the reservoir 61. A conduit 72 interconnects a fluid accumulation chamber 73 surrounding the discharge gap 52 with the reservoir 61.

In this particular embodiment, a temperature sensing element 76 is located in the conduit 67 for sensing and monitoring the temperature of the fluid flowing therethrough. While for illustrative purposes the element 76 has been shown in the conduit 67, and such is one preferred location, it will be recognized that it can be located anywhere where it will be sensitive to the energy absorbed by the brake. This, for example, includes also the temperature of the fluid anywhere in the retarder system, including within the retarder mechanism 33 itself or within or on any conduit or liquid containing chamber. A temperature responsive element 77 is connected in association with the temperature sensing element 76 and is responsive to the temperature detected thereby. A lever arm 78 is operable in response to the input to the temperature responsive element 77. In this particular embodiment, the lever arm 78 is pivotable forwardly and rearwardly about the pivot axis 79 in response to the temperature detected by the temperature sensing element 76.

A linkage system 81 interconnects the ends of the lever arms 17 and 78 and includes a link 82 which is pivotable about a pair of parallel pivot axes 83 and 84. A link arm 86 interconnects the link arm 82 at the pivot axis 84 with the free end of the lever arm 78. A link arm 87 interconnects the link arm 82 at the pivot axis 88 with the free end of the lever arm 17 on the valve 16.

An accelerator pedal 89 is pivotable about a pivot axis 91 and is connected through a link arm 92 to the link arm 82 at the pivot axis 83. The link arm 92 is connected to the accelerator pedal 89 at the pivot axis 93 so that movement of the pedal 89 will cause a movement of lever 17 on the valve 16.

It is to be recognized that other types of feedback apparatus can be utilized in place of the linkage system 81 to transfer the signal indicating an increased temperature in the liquid circuitry to the fuel control apparatus 16 and 17.

OPERATION

The operation of the device embodying the invention has been indicated above but will be described in detail hereinbelow to insure a full understanding of the invention.

When the output shaft 29 of the gas turbine engine 11 is connected to the drive wheels 42 of a vehicle through the clutch 40 and transmission 39, the liquid retarder mechanism 33 is in a conventional manner rendered inoperative by control valve 68. Thus, there will be no drag on the output shaft 29 of the engine 11 during a driving or cruising condition.

However, during a shift of the transmission 39 from one gear ratio through neutral to another gear ratio, a movement of the pedal 70 operates the clutch 40 to disconnect, though only momentarily, the transmission 39 from the gear 37 and shaft 38 so that the output shaft 29 would tend to accelerate at a dangerous rate. However, the operation of the pedal 70 will simultaneously render the control valve 68 operative to permit a flow of liquid therethrough to the pressure creating zone 51 in the retarding mechanism 33. During the gear shifting operation, the input member 47 is rotating at a normal turbine rotational speed, namely 30,000 r.p.m., heat is generated in the fluid which must be dissipated by the heat exchanger 66. If the operator reduces the fuel supply to essentially no load conditions, then the power output of the turbine to be absorbed by the retarder and dissipated by the heat exchanger will be within the capacity of the heat exchanger and the temperature of the retarder liquid will not rise. However, if the operator maintains the fuel supply at full power during the shift, then however, even though the liquid is driven through the heat exchanger 66, the temperature of the liquid will increase since the horsepower output of the engine and directed by the retarding mechanism into the retarder liquid is greater than the horsepower capacity of the heat exchanger. As a result, the temperature of the retarder liquid will rise and the temperature sensing element 76 will sense the increased temperature. This will cause the temperature responsive element to move the lever arm 78 counterclockwise.

If it is still assumed that the operator maintains a constant pressure on the accelerator pedal 89, a counterclockwise movement of the lever arm 78 will cause a clockwise movement of the link arm 82 about the pivot axis 83. This in turn will cause a clockwise movement of the lever arm 17 on the control valve 16 to decrease the quantity of fuel introduced into the combustion apparatus 13 through the nozzles 21. Accordingly, the horsepower output of the engine 11 is decreased independent of the operator's control of the accelerator pedal 89 to a level within the horsepower capacity of the heat exchanger and within a safe value for the other associated equipment.

The invention has for simplicity of illustration been shown with the engine connected directly to the fluid coupling and this arrangement is desirable for a high speed (as 30,000 r.p.m.) engine in order to enable the coupling to be of very small diameter. However, wherever it is desirable to have the coupling run at any speed, faster or slower, than that of the engine, it will of course be possible to gear same up or down as necessary, or otherwise provide in any conventional manner for a suitable ratio relationship between the speed of the engine and that of the coupling. Particularly, it will be recognized that where, if at all, the lineal speed of the coupling blades creates a cavitation problem, the coupling may be geared down to the extent necessary without departure from the concepts of the invention.

Similarly the two sides of the fluid coupling are for simplicity shown as mounted directly on the engine shafts. It will be obvious in view of the foregoing that either or both of them may be indirectly connected to the engine shafts in any manner to maintain a selected speed ratio between the respective sides of the coupling and the shafts of the engine respectively connected therewith. For example, the left side of the coupling may be driven from the shaft 38.

I claim:

1. In combination with an engine having operator controlled power controlling means and an output shaft connected in association with load means, a speed limiting mechanism connected to the output shaft for absorbing energy therefrom, comprising:

energy absorbing monitoring means connected in association with said speed limiting means responsive to the energy absorbed by said speed limiting means and capable of issuing a response at a predetermined level of absorbed energy; and transformation means connected for actuation by said energy absorbing monitoring means and further connected to said power controlling means of the engine for controlling the power output of said engine, said energy absorbing monitoring means continuously monitoring the energy absorbed by said speed limiting mechanism over a prolonged period of operation of said engine and responding to an exceeding of a predetermined value of absorbed energy in said speed limiting mechanism to limit the power output of said engine independent of the operator's control of the power controlling means and after said power output of said engine has been limited and the response of said energy absorbing monitoring means indicates that said absorbed energy is reduced below said predetermined value, said transformation means will respond to said energy absorbing monitoring means to return said power controlling means to the control of the operator so that the power output of the engine can be set at a desired level providing said desired level is below said predetermined value of energy absorbed by said speed limiting mechanism.

2. In combination with an engine having operator controlled speed controlling means and an output shaft connected in association with load means, a fluid retarder mechanism connected to the output shaft for regulating the output speed thereof, and having fluid circuit means connected to said retarder for supplying the circulating fluid thereto, comprising:

temperature monitoring means connected in association with said fluid circuit means of the retarder for monitoring the temperature of the fluid in said circuit means and capable of issuing a response at a predetermined temperature of said liquid; and transformation means connected for actuation by said temperature monitoring means and further connected to said speed controlling means of the engine for controlling the rate of rotation of the output shaft of said engine, said temperature monitoring means continuously monitoring the temperature of the fluid in said circuit means, which temperature is increased and decreased as a function of the energy absorbed by said fluid retarder mechanism, over a prolonged period of operation of said engine and responding to an exceeding of a predetermined temperature value of the fluid in said circuit means to limit the power output of said engine independent of the operator's control of the speed controlling means and after said power output of said engine has been limited and the response of said temperature monitoring means indicates that said temperature of said fluid in said circuit means is reduced below said predetermined value, said transformation means will respond to said temperature monitoring means to return said speed controlling means to the control of the operator so that the power output of the engine can be set at a desired level providing said desired level produces a temperature in said fluid which is below said predetermined temperature value of the fluid in said circuit means.

3. In combination with an engine having operator controlled power controlling means and an output shaft connected in association with load means, a speed limiting device having fluid means for absorbing energy therefrom comprising:

energy absorbing monitoring means connected for monitoring the energy absorbed by said fluid means and capable of issuing a response at a predetermined level of absorbed energy; and transformation means responsive to said energy absorbing monitoring means and further connected to said power controlling means of the engine for controlling the power output of said engine, said energy absorbing monitoring means continuously monitoring the energy absorbed by said speed limiting device over a prolonged period of operation of said engine and responding to an exceeding of a predetermined value of absorbed energy in said speed limiting device to limit the power of said engine independent of the operator's control of the power controlling means and after said power output of said engine has been limited and the response of said monitoring means indicates that said absorbed energy is reduced below said predetermined value, said transformation means will respond to said energy absorbing monitoring means to return said power controlling means to the control of the operator so that the power output of the engine can be set at a desired level providing said desired level produces an energy level which is below said predetermined value of energy absorbed by said speed limiting device.

4. In combination with an engine having operator controlled power controlling means and an output shaft connected in association with load means, a speed limiting device having liquid flowing therethrough for absorbing energy therefrom comprising:

temperature monitoring means for monitoring the temperature of the liquid indicative of the energy absorbed by said liquid and issuing a response at a predetermined value of absorbed energy as measured by the temperature of said liquid; and transformation means connected for actuation by said temperature monitoring means and further connected to said power controlling means of the engine for controlling the power output of said engine, said temperature monitoring means continuously monitoring the temperature of the liquid flowing through said speed limiting device over a prolonged period of operation of said engine and responding to an exceeding of said predetermined temperature value of the liquid to limit the power output of said engine independent of the operator's control of the power controlling means and after said power output of said engine has been limited and the response of said temperature monitoring means indicates that said absorbed energy is reduced below said predetermined value, said transformation means will respond to said temperature monitoring means to return said power controlling means to the control of the operator so that the power output of the engine can be set at a desired level providing said desired level produces a liquid temperature which is below said predetermined temperature value.

5. The device defined in claim 1, wherein the speed controlling means comprises control means for the fuel input to said engine.

6. The device defined in claim 1, wherein said temperature monitoring means monitors the temperature of a liquid in said circuit means.

7. A drive system, including in combination:

a prime mover having operator controlled speed controlling means;

a change-speed gear transmission having an input, an output and at least two ratio-changing gear means comprising positively interengageable gears interposed between said input and said output, said transmission having a neutral position wherein said input and said output of said transmission are disengaged;

means operatively connecting said prime mover to said input of said transmission;

liquid brake means operatively connected to said prime mover for preventing excessive speed of said prime mover when said transmission is in said neutral position;

temperature monitoring means connected in association with said liquid brake means for monitoring the temperature of the liquid flowing therethrough, said temperature monitoring means capable of issuing a response at a predetermined temperature of said liquid; and transformation means connected for actuation by said temperature monitoring means and further connected in association with said prime mover for controlling the rate of rotation of the output shaft of said prime mover, said temperature monitoring means continuously monitoring the temperature of the liquid flowing through said liquid brake means over a prolonged period of operation of said prime mover and responding to an exceeding of a predetermined temperature of said liquid to limit the power output of said prime mover independent of the operator's control of the power controlling means and after said power output of said prime mover has been limited and the response of said temperature monitoring means indicates that said temperature is reduced below said predetermined temperature of said liquid, said transformation means will respond to said temperature monitoring means to return said power controlling means to the control of the operator so that the power output of the prime mover can be set at a desired level providing said desired level operates said liquid brake means so as to generate a temperature in said liquid which is below said predetermined temperature of said liquid.